Sept. 4, 1962 J. R. WRIGHT ETAL 3,052,639
ASPHALT EMULSION
Filed Sept. 25, 1957
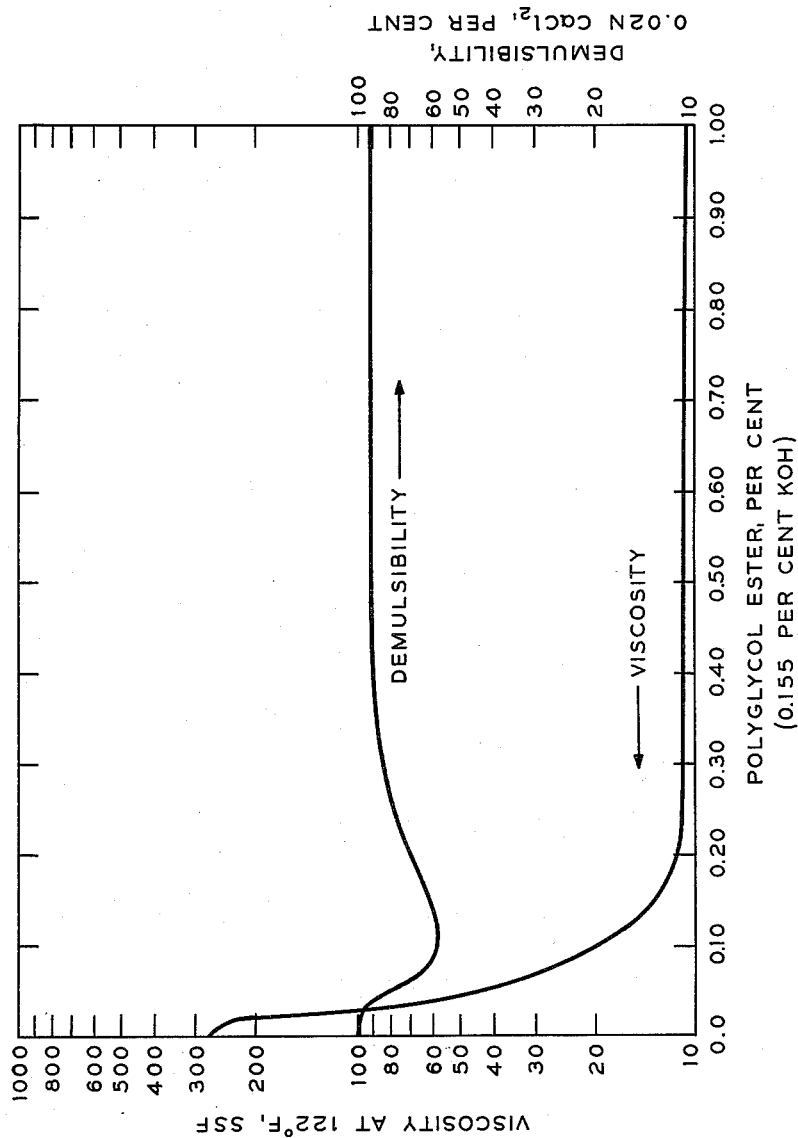
INVENTORS
JAMES R. WRIGHT
EDWARD W. MERTENS
BY
ATTORNEYS

United States Patent Office 3,052,639
Patented Sept. 4, 1962

3,052,639
ASPHALT EMULSION
James R. Wright and Edward W. Mertens, El Cerrito, Calif., assignors to California Research Corporation, San Francisco, Calif., a corporation of Delaware
Filed Sept. 25, 1957, Ser. No. 686,087
2 Claims. (Cl. 252—311.5)

This invention relates to a new and improved asphalt emulsion. More particularly, the invention is concerned with high residue anionic asphalt emulsions having improved viscosity characteristics.

Asphalt, or bitumen as it is also called, is useful in a wide variety of applications. Illustrative applications include its use in the paving of road surfaces, waterproof coatings and protective coatings in general, as well as the impregnation of fiber-containing materials such as paper or felt.

Generally speaking, asphalt is employed in applications of the above type mainly in three forms of liquids. In perhaps its oldest form it is melted by heating and applied as a molten mass. It it also combined with volatile organic solvents to provide liquid solutions of desired viscosity known as "cutback" asphalts. Asphalt is also emulsified with water and used in the form of liquid asphalt emulsions. This last form, to which the present invention relates, has several advantages over molten asphalt and cut-back formulations. The asphalt is maintained in liquid form during application without the need for expensive heating equipment and at the same time the high cost and fire hazards involved in the use of organic solvent are avoided.

Asphalt emulsions are usually prepared by mixing the asphalt with an aqueous solution of an alkali metal hydroxide such as sodium or potassium hydroxide to saponify certain high molecular weight carboxylic acids in the asphalt. Such acids may occur naturally in the asphalt or they may be added where the natural acid content is unsatisfactorily low. The soaps thus formed serve as emulsifying agents to produce asphalt emulsions when the asphalt and water of the aqueous solution are mixed together. These asphalt emulsions are classified as anionic in nature because the alkali metal soap emulsifying agents bear a negative charge and are attracted to the anode or positive pole in solution.

A number of special properties are desirable in the so-called quick breaking asphalt emulsions of the present type. One of the most important and fundamental properties is a low viscosity in combination with a high residue. Since asphalt emulsions are usually applied by machinery, it is important that the emulsion flows freely. Low viscosity emulsions are also usually more penetrating and, therefore, more effective in the usual coating and impregnating applications. It is particularly desirable that a high residue be maintained where possible along with the low viscosity of the asphalt emulsion in order to avoid the necessity for handling unduly large amounts of emulsion in a given application. The stabilies of asphalt emulsions are also important factors because it is highly desirable that separation of the asphalt and aqueous phases and increased viscosities be avoided when the emulsions are allowed to stand as during storage. At the same time, it is essential that the emulsion separate rapidly on contact with the material to be coated or impregnated such as aggregate, felt and paper. Suitable asphalt emulsions should likewise quickly demulsify in the presence of electrolytes such as calcium chloride.

It has now been found that a greatly improved high residue asphalt emulsion of low viscosity is obtained in the composition comprising an anionic asphalt emulsion and from 0.05 to 2.0 percent by weight of polyethylene glycol monoester of fatty acid having from 2 to 75 ethylene glycol units and from 12 to 24 carbon atoms in the fatty acid.

The superior new asphalt emulsions of the invention possess remarkably low viscosities compared to similar emulsions which do not contain the polyglycol ester of fatty acid. The emulsions are characterized by surprisingly high residues considering the low viscosities. These important properties permit the most effective utilization of the emulsions in coating and impregnating applications. The emulsions also have excellent stability under storage conditions and do not increase unduly in viscosity or separate on standing. Their demulsibility and quick breaking properties are also outstanding.

According to the present invention, suitable anionic asphalt emulsions are prepared by mixing hot molten asphalt with a hot aqueous solution of an alkali metal hydroxide having a concentration within the range of from about 0.01 to about 2.0 percent by weight alkali metal hydroxide. For present purposes, potassium hydroxide, particularly in concentrations of 0.05 to 0.30, is preferred. Usually from 40 to 80% of asphalt is employed with from 20 to 60% of water.

The polyethylene glycol monoester of fatty acid is employed in the anionic asphalt emulsion of the invention in any proportion sufficient to lower the viscosity of the emulsion. Preferably from about 0.05 to about 2.0 percent by weight is used based on the total emulsion. The polyglycol ester of fatty acid may be added to either the aqueous metal hydroxide solution or the asphalt prior to mixing. It may also be added to the anionic asphalt emulsions after they are formed. However, the most effective reduction in viscosity is obtained by adding the polyglycol ester of fatty acid to the aqueous alkali metal hydroxide solution prior to mixing with the asphalt.

Suitable polyglycol esters of fatty acids contain from 2 to 75 ethylene glycol units and from 12 to 24 carbon atoms in the fatty acid, as mentioned above. They are illustrated by the formula

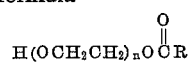

wherein $n$ is the number of glycol units and R is the aliphatic hydrocarbon group of the fatty acid. The fatty acids are either saturated or unsaturated with saturated acids being presently preferred. Illustrative polyethylene glycol esters of fatty acids include polyethylene glycol laurate having 5 ethylene glycol units, polyethylene glycol palmitate having 30 ethylene glycol units, polyethylene glycol myristate having 20 ethylene glycol units, polyethylene glycol stearate having 50 ethylene glycol units, polyethylene glycol behenate having 65 ethylene glycol units and polyethylene glycol erucate having 60 ethylene glycol units. Presently preferred are the polyethylene glycol monoesters of fatty acids containing an average of from about 15 to 50 ethylene glycol units and from 12 to 18 carbon atoms in the fatty acid.

A wide variety of asphalts are suitable in the preparation of the superior new asphalt emulsion according to this invention. Asphalts which normally contain sufficient high molecular weight carboxylic acids to provide emulsions upon saponification of the acids with aqueous alkali metal hydroxide solutions are preferred. It is possible, however, to increase or decrease the amount of high molecular weight carboxylic acid in the asphalt and provide more or less saponified carboxylic acid emulsifying agent where that is desirable.

In a typical preparation, the aqueous alkali metal hydroxide emulsifying base is mixed with the asphalt at a temperature in the range of from about 120 to 180° F. Where colloid mills are employed the temperatures may be raised to 300° F. or more. It is essential that the asphalt be in a molten state prior to mixing. Usually, temperatures of around 300° F. are sufficient but the exact temperature will depend on the softening point of the particular asphalt employed in preparing the emulsion.

In a further illustration of the greatly improved high residue anionic asphalt emulsions of the invention, a series of emulsions was prepared and tested, as outlined in the following paragraphs.

All of the emulsions were prepared in 2,500 gm. quantities in a steam heated, stainless steel vessel equipped with a 1,725 r.p.m. stirrer, temperature gauge, condenser and electrically heated asphalt reservoir. The aqueous phase consisting of distilled water, alkali metal hydroxide and the specified polyethylene glycol ester of fatty acid is made up in the vessel and brought to a temperature of 160° F. with continuous stirring. Simultaneously, the asphalt is put into the asphalt reservoir and brought to a temperature of 250° F. When both the aqueous and asphalt phases are at the desired temperatures, the asphalt is added to the aqueous phase over a three-minute period. Following an additional 30 seconds stirring period, the emulsion is withdrawn into a one-gallon glass jar. The glass jar is covered and placed in a 120° F. oven for over-night storage prior to testing.

The asphalt employed in the tests was a typical Venezuelan asphalt of 200 to 250 penetration. The emulsions were formulated with 58% by weight asphalt, potassium hydroxide, polyethylene glycol ester of fatty acid and the balance water, as indicated in the table below.

The viscosity in seconds Saybolt Furol for 60 mls. at 122° F. and the demulsibility were determined according to the "Standard Methods of Testing Emulsified Asphalts" ASTM designation D-244-55. The demulsibility of a particular emulsion is the percentage by weight of the asphalt present that fails to pass a No. 14 wire cloth when a 100 gm. sample of the emulsion is mixed with 35 mls. of 0.02 N calcium chloride solution. The residue test determines the percent by weight of residue which remains after a 25 gm. sample of the emulsion is heated until all of the water is evaporated. The polyethylene glycol monoester of fatty acid employed in the test illustrates two types of esters. One type is the polyethylene glycol stearate having approximately 5 ethylene glycol units. This material is known to the trade by the name "Ethofat 60/15" and is manufactured by Armour Company. The second type is polyethylene glycol stearate having an average of approximately 50 ethylene glycol units. This latter material is known to the trade as "Ethofat 60/60" and is also manufactured by Armour Company.

*Table*

| Variable components— Polyglycol ester of fatty acid, percent | | Properties | | | | | | |
|---|---|---|---|---|---|---|---|---|
| | | Viscosity SSF at 122°F. | Demulsibility (0.02 N CaCl$_2$) | Residue, percent | Particle size ($\mu$) | | Storage stability 1 week at 160°F. | |
| (1) | (2) | | | | Range | Predominant | Viscosity | Demulsibility, percent |
| 0.00 | ------ | 226 | 97 | 57.6 | 1–10 | 2.5 | 442 | 100 |
| 0.025 | ------ | 469 | 98 | 57.2 | 1–10 | 3 | 449 | 100 |
| 0.05 | ------ | 656 | 98 | 57.2 | 1– 7 | 2.5 | 233 | 98 |
| 0.075 | ------ | 486 | 98 | 57.2 | 1– 7 | 2.5 | 83 | 96 |
| 0.10 | ------ | 718 | 100 | 56.8 | 1–12 | 3.5 | 168 | 97 |
| 0.20 | ------ | 451 | 98 | 57.2 | 1–10 | 3 | 108 | 75 |
| 0.35 | ------ | 244 | 99 | 57.2 | 1–10 | 4 | 46 | 84 |
| 0.50 | ------ | 335 | 100 | 57.2 | 1–10 | 4 | 59 | 61 |
| 0.65 | ------ | 261 | 100 | 57.6 | 1–10 | 4 | 95 | 52 |
| 0.80 | ------ | 259 | 99 | 57.6 | 1– 8 | 4 | 110 | 54 |
| 1.00 | ------ | 259 | 95 | 58.0 | 1–15 | 4 | 61 | 38 |
| ------ | 0.00 | 280 | 100 | 57.2 | 1– 8 | 4 | 432 | 96 |
| ------ | 0.025 | 220 | 100 | 57.2 | 1– 7 | 3 | 130 | 95 |
| ------ | 0.05 | 38 | 85 | 56.8 | 0.5– 3 | 1.5 | 30 | 86 |
| ------ | 0.075 | 29 | 63 | 57.2 | 0.5– 2 | 1.5 | 24 | 59 |
| ------ | 0.10 | 19 | 59 | 56.4 | 0.5– 2 | 1 | 19 | 57 |
| ------ | 0.20 | 11 | 71 | 56.8 | 0.5– 7 | 1 | 14 | 67 |
| ------ | 0.35 | 11 | 86 | 56.8 | 0.5– 8 | 2 | 13 | 83 |
| ------ | 0.50 | 11 | 91 | 57.2 | 0.5–15 | 3 | 14 | 89 |
| ------ | 0.65 | 11 | 91 | 57.2 | 0.5–15 | 4 | 14 | 88 |
| ------ | 0.80 | 10 | 94 | 57.2 | 0.5–20 | 4 | 14 | 84 |
| ------ | 1.00 | 10 | 91 | 57.2 | 0.5–20 | 5 | 14 | 60 |
| 0.30 | 0.00 | 711 | 100 | 56.4 | 1– 5 | 2 | 247 | 100 |
| 0.27 | 0.03 | 27 | 100 | 58.4 | 1– 5 | 2 | 19 | 94 |
| 0.24 | 0.06 | 88 | 100 | 57.6 | 1–10 | 3 | 33 | 80 |
| 0.21 | 0.09 | 71 | 96 | 57.2 | ½–10 | 1 | 28 | 68 |
| 0.18 | 0.12 | 44 | 73 | 57.6 | ½–10 | 1 | 23 | 48 |
| 0.15 | 0.15 | 20 | 58 | 56.8 | ½– 2 | 1 | 17 | 47 |
| 0.12 | 0.18 | 16 | 68 | 56.8 | ½–10 | 1 | 18 | 65 |
| 0.09 | 0.21 | 17 | 73 | 57.6 | ½– 5 | 1.5 | 17 | 71 |
| 0.06 | 0.24 | 15 | 88 | 56.4 | ½– 7 | 4 | 16 | 85 |
| 0.03 | 0.27 | 14 | 70 | 55.3 | ½–15 | 1 | 15 | 69 |
| 0.00 | 0.30 | 14 | 81 | 65.4 | 1– 5 | 2 | 16 | 82 |

[1] Polyethylene glycol monostearate having an average of approximately 5 ethylene glycol units.
[2] Polyethylene glycol monostearate having an average of approximately 50 ethylene glycol units.

NOTE.—In the above compositions the KOH concentration was constant at 0.155%.

The above test results show that the surprisingly improved anionic asphalt emulsions containing polyglycol esters of fatty acids in accordance with the invention have much lower viscosities than corresponding emulsions which contain no polyglycol esters of fatty acids. This fact is particularly apparent in the stable viscosities of the emulsions after one week in storage at 160° F. The outstanding qualities of asphalt emulsions containing the preferred polyglycol monoesters of fatty acid are also readily seen from the test results. The esters containing a higher proportion of ethylene glycol units, as illustrated by the polyglycol ester of fatty acid (2) provide asphalt emulsions with surprisingly low viscosities.

The emulsions according to the present invention are also shown by the above test results to have remarkably high residues, considering their low viscosities. The combination of high residues with low viscosity means that the emulsions of the invention are outstandingly effective in coating and impregnating applications.

In further illustration of the superior new anionic asphalt emulsions of the invention, the above test data relating to the polyethylene glycol monostearate having an average of approximately 50 ethylene glycol units have been plotted to give the graph of the accompanying drawing. The graph provides a visual appreciation of the effect of the polyglycol esters of fatty acids on typical anionic asphalt emulsions. When employed in the specific proportions according to the present invention a remarkable improvement in viscosity of the asphalt emulsions is obtained by the use of polyglycol ester of fatty accid. The graph further shows that the improved anionic asphalt emulsions not only have desirable low viscosities, but also possess excellent demulsibility characteristics.

We claim:

1. An improved high residue asphalt emulsion of low viscosity consisting essentially of an anionic soap asphalt emulsion and from 0.05 to 1.0 percent by weight of polyethylene glycol monostearate having an average of approximately 50 ethylene glycol units, said monostearate being sufficient to lower the viscosity of the emulsion and said anionic soap asphalt emulsion being prepared by mixing from 40 to 80 percent by weight of molten asphalt with from 20 to 60 percent by weight of aqueous solution of from about 0.05 to about 0.30 percent by weight of potassium hydroxide so as to saponify high molecular weight carboxylic acids in the asphalt, the aforesaid proportions being based on the total asphalt emulsion.

2. An improved high residue asphalt emulsion of low viscosity consisting essentially of an anionic soap asphalt emulsion and from 0.05 to 1.0% by weight of polyethyleneglycol monostearate having an average of approximately 50 ethyleneglycol units, said monostearate being sufficient to lower the viscosity of the emulsion and said anionic soap asphalt emulsion being prepared by mixing from 40 to 80% by weight of molten asphalt with from 20 to 60% by weight of aqueous solution of about 0.155% by weight of potassium hydroxide so as to saponify high molecular weight carboxylic acids in the asphalt, the aforesaid proportions being based on the total asphalt emulsion.

References Cited in the file of this patent

UNITED STATES PATENTS

| | | |
|---|---|---|
| 1,643,675 | Montgomerie | Sept. 27, 1927 |
| 2,635,055 | Figdor | Apr. 14, 1953 |
| 2,701,777 | Farris | Feb. 8, 1955 |
| 2,706,688 | Sommer et al. | Apr. 19, 1955 |
| 2,789,917 | Hardman et al. | Apr. 23, 1957 |

OTHER REFERENCES

Griffin: "The American Perfumer and Essential Oil Review," May 1955, pp. 26–29.

Atlas Guide to the Use of Sorbital and Surfactants in Cosmetics, publ. by Atlas Powder Co., 1956, pp. 16, 31.